(No Model.)
J. MORRISON.
COMBINED HORSE COLLAR AND HAMES.
No. 508,483. Patented Nov. 14, 1893.
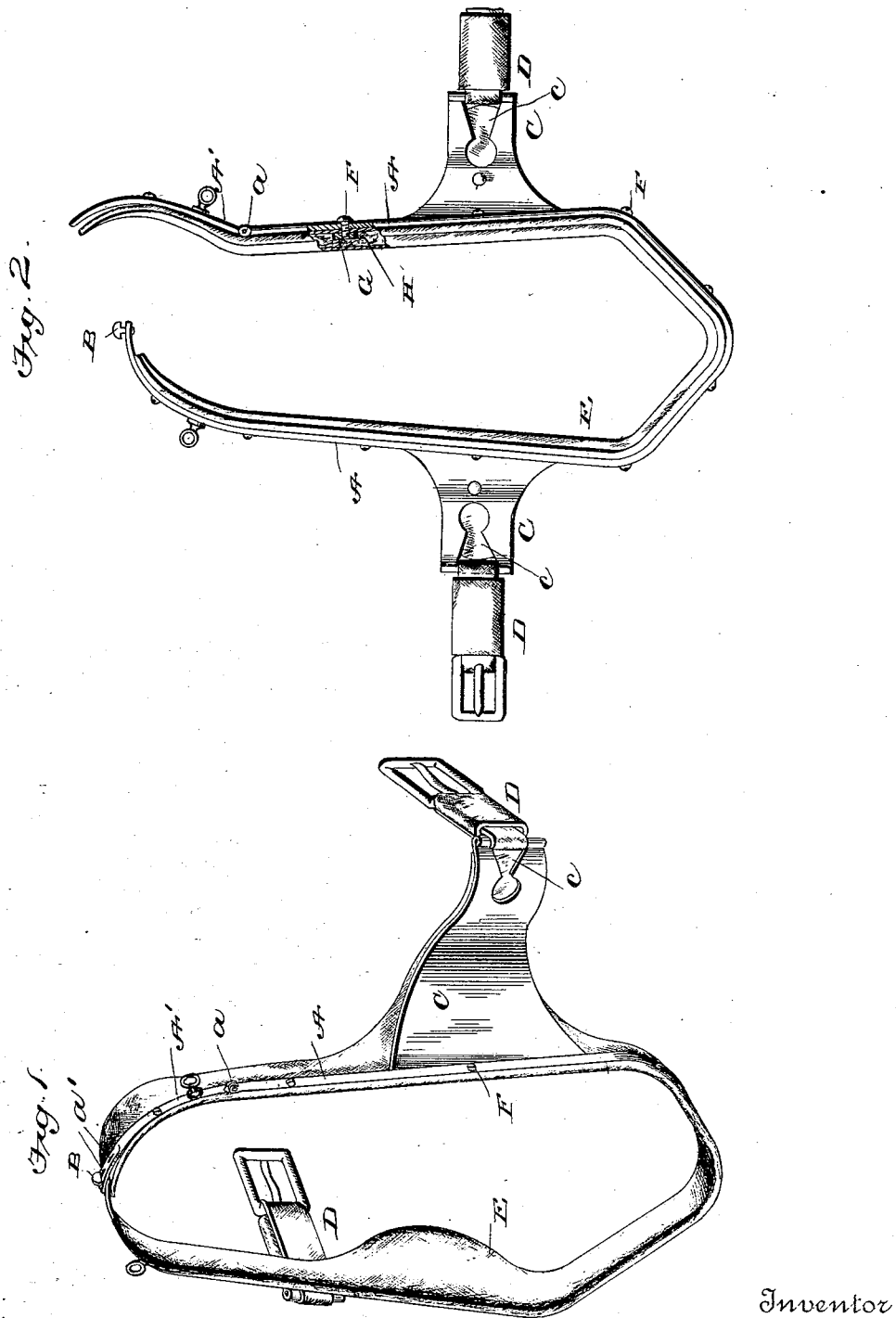
Witnesses
Inventor
Joseph Morrison
By T.J.W. Robertson
Attorney

United States Patent Office.

JOSEPH MORRISON, OF PETROLIA, CANADA, ASSIGNOR OF ONE-HALF TO BENJAMIN S. VAN TUYL, OF SAME PLACE.

COMBINED HORSE COLLAR AND HAME.

SPECIFICATION forming part of Letters Patent No. 508,483, dated November 14, 1893.

Application filed May 6, 1893. Serial No. 473,278. (No model.)

*To all whom it may concern:*

Be it known that I, JOSEPH MORRISON, a subject of the Queen of Great Britain, residing at Petrolia, in the county of Lambton, in the Province of Ontario, Canada, have invented certain new and useful Improvements in a Combined Horse Collar and Hame, of which the following is a specification, reference being had therein to the accompanying drawings.

This improvement relates to that class of combined collar and hame in which the hames are permanent attachments to the collar or padding, and the invention consists in the peculiar construction, arrangement and combinations of parts hereinafter more particularly described and then definitely claimed.

In the accompanying drawings—Figure 1 is a perspective view of a collar constructed according to my improvement. Fig. 2 is a front view of the same open at top and with part broken away.

Referring now to the details of construction—A represents the hame or iron part of the collar, which iron extends nearly all around the collar in one piece from near the top to the point *a* where a section of the iron A' is pivoted to the main iron in such a manner as to open as shown in Fig. 2. The top of the iron A is provided with a button B, which may be turned cross-wise as shown in Fig. 1 to fasten the section in place, or it may be set parallel with the slots *a'* in the section so as to readily pass into either of said slots at will according to the size of the horse's neck. To the sides of this iron are secured in any desirable or convenient way, or formed therewith, the draft-clips C shaped to fit the horse's shoulders and having an opening *c* and with their outward ends turned round to form a pintle on which the leather tugs D swing.

Inside of the hame is set the collar or padding E secured to the iron portion or hame by screws F which pass through the iron and through outer thickness of the collar into nuts G embedded in the stuffing H of the collar. As will be seen on examining the drawings, the padded portion of the collar extends outward under the draft-clips C, so as to prevent chafing of the skin of the horse at this point.

By the above it will be seen that I have produced a cheap and convenient combined collar and hame that will be found to be strong, durable, easy on the horse and not liable to get separated or broken, inasmuch as the body of the iron is practically in one piece except for a small section at the top which opens to admit the horse's neck.

Any other desired form of fastening may be substituted for the button shown.

I propose to put the usual terrets I in the hames in order to allow of driving with either single or double harness.

What I claim as new is—

1. A combined horse collar and hame, comprising a sheet metal hame having draft-clips formed thereon and adapted to conform to the shoulders of the animal, said clips having their outward ends turned round to receive pintles on which tugs are secured, a padding secured to said hame and clip, and a hinged section at the upper portion of the hame provided with fastening devices, substantially as described.

2. A combined horse collar and hame, comprising a metal hame extending in one piece nearly around the collar, a hinged section having one end secured to one side of said hame by a hinged joint and its other end secured to the center of the top of said hame by a turn-button, and the collar or padding E secured to one side of said hame and extending around to the opposite side and under the joint at the center of the top of the hame, substantially as described.

JOSEPH MORRISON.

Witnesses:
 A. E. SHAUNESSY,
 EDITH C. EMERY.